United States Patent [19]

Asaoka et al.

[11] Patent Number: 5,133,183
[45] Date of Patent: Jul. 28, 1992

[54] GEL/SOLID BIPROPELLANT PROPULSION SYSTEM WITH ENERGY MANAGEMENT CAPABILITY

[75] Inventors: Leo K. Asaoka; William M. Chew; Douglas L. May, all of Huntsville, Ala.

[73] Assignee: The United States of America as represented by the Secretary of the Army, Washington, D.C.

[21] Appl. No.: 662,851

[22] Filed: Mar. 1, 1991

[51] Int. Cl.$^5$ .......................... F02K 9/00; F02K 9/28
[52] U.S. Cl. ........................ 60/204; 60/251; 60/252; 60/259
[58] Field of Search ................. 60/204, 251, 252, 259

[56] References Cited

U.S. PATENT DOCUMENTS

| | | | |
|---|---|---|---|
| 2,880,582 | 4/1959 | Turansky et al. | 60/259 |
| 3,077,072 | 2/1963 | Rice | 60/252 |
| 3,136,121 | 6/1964 | Barger et al. | 60/259 |
| 3,295,322 | 1/1967 | Atkins et al. | 60/251 |
| 3,315,472 | 4/1967 | Moutet et al. | 60/251 |
| 3,529,420 | 9/1970 | Guyot | 60/251 |
| 3,541,796 | 11/1970 | Morris | 60/251 |
| 3,595,022 | 7/1971 | Radebold et al. | 60/259 |
| 3,717,999 | 2/1973 | Wilson | 60/258 |
| 3,732,693 | 5/1973 | Chu | 60/252 |
| 4,424,679 | 1/1984 | Holzman | 60/251 |

*Primary Examiner*—John J. Vrablik
*Assistant Examiner*—Howard R. Richman
*Attorney, Agent, or Firm*—Hugh P. Nicholson; Freddie M. Bush

[57] ABSTRACT

A gel/solid bipropellant propulsion system employs fuel-rich combustion gases from a solid gas generator and an oxidizer gel in a highly efficient combustion chamber wherein the fuel-rich combustion gases and the oxidizer gel are each metered through a vortex injector into a combustion chamber to produce a hypergolic reaction. The solid gas generator (SSG) has a preferred composition of glycidly azide polymer (GAP). The GAP SSG is composed of GAP diol and/or triol polymerized with a di-or tri-function isocyanate, such as isophorone diisocyanate. The gel/solid bipropellant propulsion system comprises the SSG in combination with an oxidizer storage/extrusion vessel system, a combustion chamber system, and a system controller which controls initial ignition of the SSG to produce fuel rich combustion gas which pressurize the system. The system controller monitors pressures and flow rates of fuel and gel oxidizer. System shut-down is achieved by closing valves in fuel-rich combustion gases supply line, gel oxidizer supply line, and a pressurization line to gel oxidizer storage/extrusion vessel. A blow-down line is opened to de-pressurize the SSG container which extinguishes the SSG. When start up is desired, a reignition shut-off valve is reopened which permits the injection of the gel oxidizer from the line retained under pressure and achieves reignition of the SSG.

5 Claims, 1 Drawing Sheet

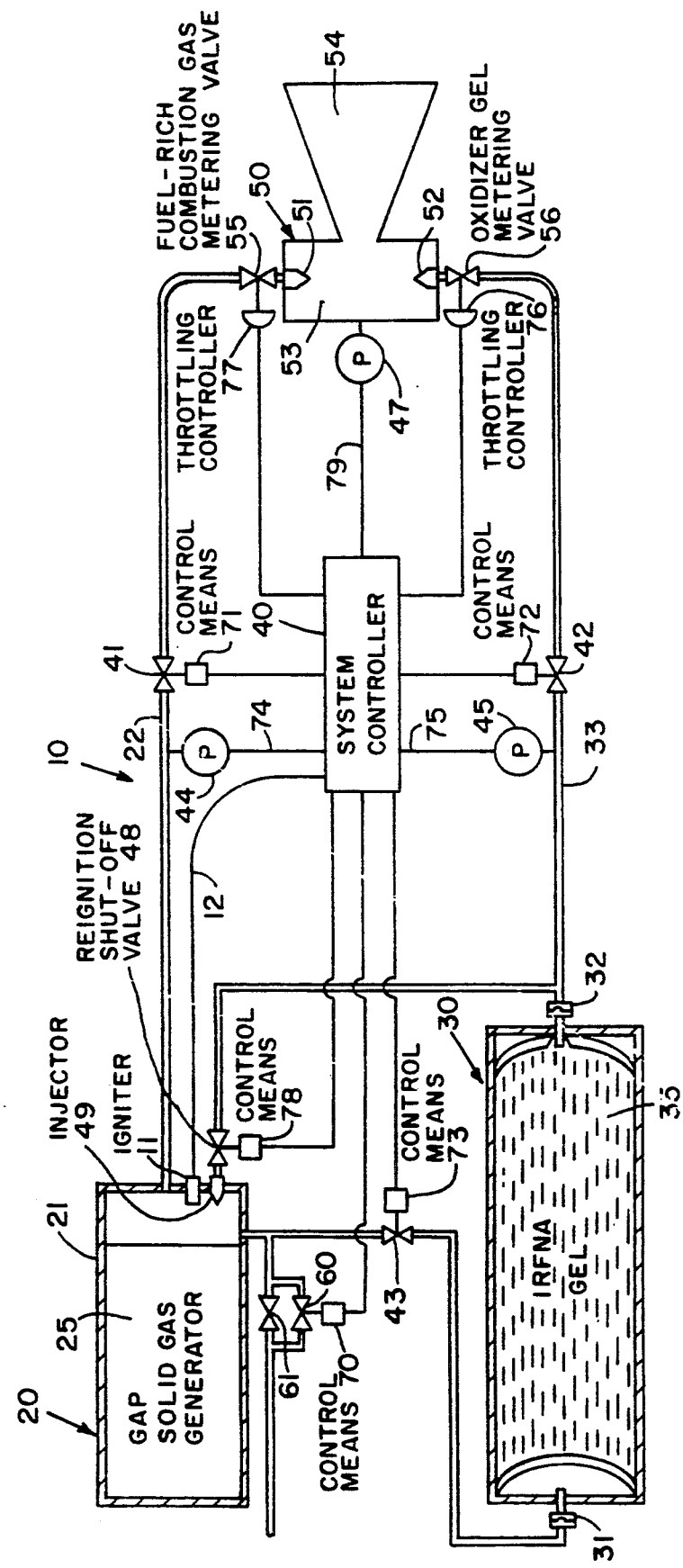

GEL/SOLID BIPROPELLANT PROPULSION SYSTEM WITH ENERGY MANAGEMENT CAPABILITY

DEDICATORY CLAUSE

The invention described herein may be manufactured, used, and licensed by or for the Government for governmental purposes without the payment to us of any royalties thereon.

BACKGROUND OF THE INVENTION

Most Army tactical missiles currently being developed require high performance, minimum signature, and adherence to Department of Defense (DOD) Insensitive Munitions guidelines. In addition, several of these advanced missiles require the propulsion system to have energy management capability; that is, the ability to start, stop, pulse, and/or throttle their propulsion systems in order to extend range and improve kill efficiency during target approach. None of the Army's currently deployed missile system have propulsion that meet these requirements. Solid propulsion systems are compact and can be stored easily; however, energy management is difficult to design into these systems. Minimum smoke insensitive solid propulsion systems have lower performance than the sensitive, smoky, solid systems. Liquid propulsion systems are inherently insensitive to impact or shock and have energy management capability, but do not have high volumetric efficiency and often contain expensive and complicated components. Liquid bipropellant systems are usually toxic and are hazardous to personnel/environment if propellant tanks develop leaks or are ruptured. The selection of the gelled inhibited red-fuming nitric acid oxidizer reduces these considerations appreciably. The primary objective of this invention is to provide an insensitive propulsion system with energy management capability. The propulsion system meets a long sought need. The advantages of a gel/solid bipropellant propulsion system with energy management capability in accordance with this invention will be further disclosed hereinbelow. Also, the additional objectives of the disclosed invention include providing a solid fuel gas generator in combination with an oxidizer which is hypergolic with a solid fuel grain as well as the fuel rich gases generated by the solid propellant gas generator. Other additional objectives of the invention will be apparent to those skilled in the art from the ongoing disclosure of this invention.

SUMMARY OF THE INVENTION

The bipropellant propulsion system of this invention comprises a solid fuel gas generator which is ignited by an igniter to thereafter furnish fuel-rich effluent for combustion and for pressurizing and expelling a gelled oxidizer from an oxidizer storage vessel. The propulsion system is managed for a wide range of thrust levels by a system controller which initially activates the igniter and monitors and controls the throttling of the fuel-rich combustion effluent through a metering valve. The oxidizer is likewise monitored and controlled by the throttling of an oxidizer metering valve. Pre-selected amounts of the fuel-rich combustion effluent and the oxidizer are combined in a combustion chamber system after being expelled through vortex injectors to produce a hypergolic reaction. The combustion chamber system additionally includes an expansion nozzle through which the final gaseous products of combustion are expelled to provide propulsion from the bipropellant system. The injector/combustion chamber pressure is monitored and controlled from pre-selected data furnished to the system controller which can initiate shut-down procedures which includes rapid pressure reduction of the solid fuel gas generator pressure by opening a blow-down valve to extinguish combustion of the solid fuel. This feature is useful for missile systems with a coast mission requirement. The system controller also provide for maintaining pressure behind the oxidizer tank and within the propellant supply lines prior to opening of a blow-down valve. The retained pressure in the propellant line and oxidizer tank enables restart procedures to be initiated by the system controller which includes establishing combustion of the solid fuel gas generator by hypergolic reaction by the oxidizer which is allowed to spray onto the solid propellant grain surface.

BRIEF DESCRIPTION OF THE DRAWING

The single FIGURE of the Drawing depicts a schematic of a bipropellant propellant propulsion system 10 including a solid fuel gas generator system 20, an oxidizer storage/extrusion vessel 30, a system controller 40, and an engine system 50 containing a combustion chamber system and nozzle.

DESCRIPTION OF THE PREFERRED EMBODIMENT

The solid fuel/gel oxidizer bipropellant propulsion system of the invention has high performance, minimum signature, and energy management capability. The schematic of the bipropellant propulsion system 10 is shown in the drawing and comprises a solid fuel gas generator system 20, an oxidizer storage/extrusion vessel 30, a system controller 40, and an engine system 50. The power supply and control means are functional with system controller; but, they are not shown since their requirements and compatibility with the bipropellant propulsion system must be selected in accordance with system's needs from well known power supplies or energy sources, sensors, and control means as further described hereinbelow.

In further reference to the FIGURE of the Drawing depicting the bipropellant propulsion system 10, the preferred solid fuel gas generator system 20 comprises cured glycidyl azide polymer 25 (GAP fuel) contained in a gas generator vessel 21. GAP gas generator composition is prepared from a glycidyl azide polymer diol and/or triol polymerized with di- or tri functional isocyanate such as isophorone diisocyanate or hexamethyl diisocyanate. No other components are required for the solid fuel gas generator, although other polymers, plasticizers, or fuel additives may be added to give better physical or improved density or performance characteristics.

The glycidyl azide polymer (GAP) has a high pressure exponent that can be exploited to control the burning rate of GAP fuel through a variable flow injector for the solid fuel gas generator (SFGG). An ignitor system is not required in the combustion chambers because the SFGG combustion products or effluent undergo a hypergolic reaction with inhibited red fuming nitric acid gel (IRFNA GEL) which is stored in the oxidizer storage/extrusion vessel.

To place the bipropellant propulsion system 10 in operation an igniter 11 with electrical lead 12, which is controlled by system controller 40, ignites the GAP based SFGG 20. The pressure builds up within the bipropellant propulsion system 10 since valves 41, 42, and 43 are positioned in open position by controller system 40. The pressure build-up ruptures burst disks 31 and 32. The pressure of fuel rich combustion gases passing through piping or discharge line 22 is monitored by fuel-rich combustion gases supply/flow line pressure sensor or gauge 44 by system controller, and the pressure of IRFNA gel oxidizer 35 passing through piping or discharge line 33 is monitored by oxidizer gel supply/flow line pressure sensor or pressure gauge 45 by system controller. Over pressurization is prevented by a pressure relief valve 61. Metering valve systems 55 and 56 for fuel-rich combustion effluent and IRFNA gel oxidizer respectively control the stoichiometric quantities of fuel-rich combustion effluent and IRFNA gel oxidizer discharged through vortex injectors 51 and 52 of engine 50 wherein a hypergolic reaction takes place in combustion zone or chamber 53 of the engine 50. Expansion nozzle 54 is in communication with combustion zone 53 of engine 50, and the discharge of the combustion products of the hypergolic reaction through expansion nozzle 54 provides thrust for a system employing the bipropellant propulsion system.

When a bipropellant propulsion system shut-down is desired, shut-off valves 41, 42, and 43 are closed off by system controller 40 to maintain pressure behind the IRFNA gel or oxidizer storage tank 30 and within propellant ingredients lines 22 and 33 which are the fuel-rich combustion effluent line and IRFNA gel oxidizer line, respectively. Blow-down shut-off valve 60 as controlled by system controller 40 is immediately opened which rapidly reduces the solid fuel gas generator pressure and extinguishes GAP combustion.

The very attractive feature of this invention for restart capability is the fact that valves 42 and 43 which were closed at shut-down leaves a positive pressure on the IRFNA gel system; therefore, the blow-down valve 60 which was opened to rapidly reduce the pressure on the GAP to thereby extinguish the GAP combustion, is closed prior to restart, and the reignition shut-off valve 48 is opened to force IRFNA gel onto the GAP surface which reignites the GAP by hypergolic reaction. The system controller operates all valves and sets flow rates for normal operation. This includes re-opening valves 41, 42, and 43 and monitoring injector/combustion chamber pressure gauge 47, data by system controller which controls the metering valve systems 55 and 56, to inject the stoichiometric quantities of fuel-rich combustion gases and IRFNA gelled oxidizer into the engine 50.

The following descriptions center around the system controller and its control of the gel/solid bipropellant propulsion system with respect to restart and energy management. The system controller 40 receives input signal through signal transmission line 74 and 75 for fuel-rich combustion effluent supply/flow line pressure gauge 44 and oxidizer gel supply/flow line pressure gauge 45 respectively. The system controller sends output signals to control means 70 for opening and closing blow-down shutoff valve for reducing pressure in the solid fuel gas generator vessel to extinguish combustions of solid fuel gas generator composition. The system controller also sends output signals to control means 71, 72, 73, and 78 for opening and closing valves 41, 42, 43, and 48 respectively. These valves are for fuel-rich combustion effluent line, oxidizer gel line, shut-off valve in oxidizer gel pressurization line, and reignition shut-off valve in oxidizer gel line respectively. The system controller controls the throttling controllers 76 and 7 for fuel-rich combustion effluent metering valve 55 and oxidizer gel metering valve 56. The system controller receives input signal through signal transmission line 79 from combustion chamber pressure gauge and data sensor 47 for controlling the combustion hypergolic reaction between the fuel-rich combustion effluent and oxidizer gel in the combustion zone 53 of the engine 50.

When a system shut-down is desired, a blow-down shut-off valve, 60 opens, which rapidly reduces the solid fuel gas generator pressure and extinguishes GAP combustion. Immediately before opening the blow-down valve, shut-off valves 41, 42, 43 close to maintain pressure behind the oxidizer gel tank and within the propellant lines. System restart occurs by closing blow down shut-off valve 60 and opening the reignition shut-off valve 48 which forces oxidizer gel to spray through injector 49 onto the SFGG grain surface. The system controller operates the valves and sets flow rates in response to system pressures and guidance and control instructions. The power supply, sensors, and control means which function with the system/controller include those elements for power supply, sensors, and control means which may be selected from well known prior art sources for functional compatibility with the system controller and its functions performed in the gel/solid bipropellant propulsion system.

Thus, the system controller requires a power or energy source which may be optional; however, the power supply or energy source, must be compatible with the control means employed to achieve a desired response time. For example, a control means which is a solenoid system has a longer response time for opening and closing valves and would require an electrical energy source. A hydraulic energy source which yields a shorter response time, such as for use in fluidic control, requires hydraulic fluid or gas media and related functional elements. The system controller can be made operable or activated by remote means included within design parameters of a selected guidance and control system employed such as infrared, electronic beam or electromagnetic wave systems including radar, radio, and television. Thus, the system controller can be linked to a ground guidance and control (G&C) system through signal processors or to a G&C system of the parent vehicle from which the gel/solid bipropellant propulsion system is ejected or launched, or to aircraft G&C system exercising control, or to on board sensors which can achieve operational compatibility with a combination of G&C systems for activating the system controller which performs the required functions needed in controlling the gel/solid bipropellant propulsion system with energy management capability.

We claim:

1. A method of operating a gel/solid bipropellant propulsion system having energy management capability including start and re-start functions, said gel/solid bipropellant propulsion system comprising in combination:

A. a solid fuel-gas generator system for generating fuel-rich combustion effluent for pressurizing said gel/solid bipropellant propulsion system and for use as fuel in a hypergolic combustion reaction with a gelled oxidizer, said solid gas generator system comprising:

a. a solid fuel-gas generator composition comprising a glycidyl azide polymer diol and/or triol polymerized with a di- or tri-functional isocyanate contained within a solid fuel-gases generator containment vessel, said solid fuel-gas generator composition being capable of being ignited by an igniter or by a hypergolic oxidizer composition;

b. a solid fuel-gas generator containment vessel containing said solid fuel-gas generator composition therein, said solid fuel-gas generator containment vessel having a plurality of openings for receiving piping means which function as a third entry port for an igniter for the initial ignition of said solid fuel-gas generator composition, a first and second discharge port for discharging fuel rich combustion effluent, and a fourth port for receiving a reignition oxidizer injector;

c. a first discharge port including connected piping means for discharging said fuel-rich combustion effluent through said piping means into a combustion chamber system, said piping means provided with a fuel-rich combustion effluent supply/flow piping means pressure gauge with data monitoring by a system controller, said piping means provided with a shut-off valve operated by a system controller, sand said piping means extending from said fuel-rich combustion effluent shut-off valve and communicating with a fuel-rich combustion effluent metering valve, throttled by a system controller;

d. a second discharge port including connected piping means for said fuel-rich combustion effluent which functions to pressurize said piping means connecting said solid fuel-gas generator containment vessel to an oxidizer storage/extrusion vessel, said connected piping means in communication with a pressure relief valve and a shut-off valve responsive to a system controller;

e. a third port for receiving said igniter, activated by a system controller; and, f. a fourth port for receiving a reignition oxidizer injector;

B. an oxidizer storage/extrusion vessel system containing a gelled oxidizer of inhibited red fuming nitric acid within said oxidizer storage/extrusion vessel, said oxidizer storage/extrusion system comprising:

a. an oxidizer storage/extrusion vessel having an inlet and an outlet port, said inlet and outlet port adapted for receiving and containing a low pressure rupture disk therein;

b. an extrusion means installed within said oxidizer storage/extrusion vessel for expelling or extruding a gelled oxidizer from said oxidizer storage/extrusion vessel;

c. a first piping means connected to said outlet port for discharging said oxidizer gel into a combustion chamber, said first piping means extending to and communicating with an oxidizer gel metering valve, throttled by a system controller, said first piping means provided with an oxidizer gel supply/flow pressure gauge with data monitoring means connected to a system controller, said first piping means additionally provided with an oxidizer gel shut-off valve between said oxidizer gel supply/flow pressure gauge and said oxidizer gel metering valve supplying said oxidizer gel to a vortex injector for said combustion chamber, said oxidizer gel shut-off valve operated by a system controller;

d. a second piping means between said outlet port and said oxidizer gel shut-off valve, said second piping means extending to and communicating with said fourth port of said solid gas generator vessel, said second piping means provided with a reignition shut off valve, operated by a system controller; and, e. a reignition oxidizer gel injector installed in said fourth port of said solid fuel-gas generator containment vessel, said reignition oxidizer gel injector provided with piping means communicating with said reignition shut-off valve;

C. an engine comprising in combination:

a. a combustion chamber adapted for containing a hypergolic reaction between fuel-rich combustion effluent and an oxidizer gel;

b. a fuel-rich combustion effluent vortex injector in communication with said combustion chamber and connected to said fuel-rich combustion effluent metering valve and said piping means for discharging said fuel-rich combustion effluent into said combustion chamber;

c. an oxidizer gel vortex injector in communication with said combustion chamber and connected to said oxidizer gel metering valve and said first piping means for discharging said oxidizer gel into said combustion chamber; and, d. an exhaust nozzle connected to said combustion chamber for exhausting exhaust products produced in said combustion chamber from hypergolic reaction between said fuel-rich combustion effluent and said oxidizer gel; and, D. a system controller for controlling said gel/solid bipropellant propulsion system comprising:

a. an igniter including means operated by said system controller for activating said igniter for initially igniting said solid fuel-gas generator;

b. means operated by said system controller for monitoring said oxidizer gel supply/flow line pressure gauge;

c. means connected to said system controller for monitoring said fuel-rich combustion effluent supply/flow line pressure gauge;

d. control means connected to said system controller for opening and closing a blow-down shut-off valve for reducing pressure in said solid fuel-gas generator containment vessel to extinguish combustion of said solid fuel-gas generator composition;

e. control means connected to said system controller for opening and closing said reignition shut-off valve;

f. control means connected to said system controller for opening and closing said shut off valve in said piping means connecting said solid fuel-gas generator containment vessel and said oxidizer storage/extrusion vessel;

g. control means connected to said system controller for opening and closing said oxidizer gel shut-off valve in said first piping means connecting said outlet port and said oxidizer gel metering valve;

h. throttling means connected to said system controller for controlling the discharging of said oxidizer gel through said oxidizer gel metering valve into said combustion chamber;

i. control means connected to said system controller for opening and closing said fuel rich combustion effluent shut-off valve in said piping means connecting said first discharge port and said fuel-rich combustion effluent metering valve;

i. throttling means connected to said system controller for controlling the discharging of said fuel-rich combustion effluent through said fuel rich combustion effluent metering valve into said combustion chamber;

k. monitoring means connected to said system controller for controlling the discharging of said fuel-rich combustion effluent and said oxidizer gel into said combustion chamber; and, said method of operating the gel/solid bipropellant propulsion system wherein said start function is achieved by the step of igniting said solid fuel-gas generator composition with said igniter activated by said system controller, said igniter igniting said solid fuel-gas generator composition to generate said fuel-rich combustion effluent for fuel and for pressurizing said gel/solid bipropellant propulsion system to extrude said oxidizer gel which is subsequently injected through said oxidizer gel vortex injector into said combustion chamber system for hypergolic reaction with said fuel-rich combustion effluent which is simultaneously injected through said fuel-rich combustion effluent vortex injector.

2. The method of operating the gel/solid bipropellant propulsion system as defined by claim 3 wherein a shutdown of said gel/solid bipropellant propulsion system is achieved by said system controller which effects simultaneous closing of said fuel-rich combustion effluent shut-off valve, and said oxidizer gel shut-off valve, and said shut-off valve in said piping means connecting said solid fuel-gas generator containment vessel and said oxidizer storage/extrusion vessel, and wherein immediately thereafter, said system controller effects opening of said blow-down shut-off valve which reduces pressure in said solid fuel-gas generator vessel to thereby achieve extinguishment of combustion of said solid fuel-gas generator composition.

3. The method of operating the gel/solid bipropellant propulsion system as defined by claim 2 wherein a restart of said gel/solid bipropellant is achieved by said system controller which effects closing of said blow-down shut-off valve, effects opening of said reignition shut-off valve to allow said oxidizer ge to spray onto said solid fuel-gas generator composition to achieve hypergolic ignition, and wherein, immediately thereafter, said system controller effects simultaneously opening of said fuel-rich combustion effluent shut-off valve, said oxidizer gel shut-off valve, and said shut-off valve in said piping means connecting said solid fuel-gas generator containment vessel and said oxidizer storage-extrusion vessel, and wherein said system controller additionally operates all of said valves to achieve simultaneous injection of said oxidizer gel through said oxidizer gel vortex injector and said fuel-rich combustion effluent through said fuel-rich combustion effluent vortex injector into said combustion chamber system for hypergolic reaction of said fuel-rich combustion effluent with said oxidizer gel.

4. A gel/solid bipropellant propulsion system having energy management capability including start and restart functions, said gel/solid bipropellant propulsion system comprising in combination:

A. a solid fuel-gas generator system for generating fuel-rich combustion effluent for pressurizing said gel/solid bipropellant propulsion system and for use as fuel in a hypergolic combustion reaction with a gelled oxidizer, said solid fuel-gas generator system comprising:

a. a solid fuel-gas generator composition contained within a containment vessel, said solid fuel-gas generator being capable of being ignited by an igniter or by a hypergolic oxidizer composition;

b. a solid fuel-gas generator vessel containing said solid fuel-gas generator composition therein, said solid fuel-gas generator containment vessel having a plurality of openings for receiving piping means which function as a third entry port for an igniter for the initial ignition of said solid fuel-gas generator composition, a first and second discharge port for discharging fuel-rich combustion effluent, and a fourth port for receiving a reignition oxidizer injector;

c. a first discharge port including connected piping means for discharging said fuel-rich combustion effluent through said piping means into a combustion chamber system, said piping means provided with a fuel-rich combustion effluent supply/floor piping means pressure gauge with data monitoring by a system controller, said piping means provided with a shut-off valve operated by a system controller, and said piping means extending from said fuel-rich combustion effluent shut-off valve and communicating with a fuel-rich combustion effluent metering valve, throttled by a system controller;

d. a second discharge port including connected piping means for said fuel-rich combustion effluent which functions to pressurize said piping means connecting said solid fuel-gas generator containment vessel to an oxidizer storage/extrusion vessel, said connected piping means in communication with a pressure relief valve and a shut-off valve responsive to a system controller;

e. a third port for receiving said igniter, activated by a system controller; and, f. a fourth port for receiving a reignition oxidizer injector;

B. an oxidizer storage/extrusion vessel system containing a gelled oxidizer within said oxidizer storage/extrusion vessel, said oxidizer storage/extrusion system comprising:

a. an oxidizer storage/extrusion vessel having an inlet and an outlet port, said inlet and outlet port adapted for receiving and containing a low pressure rupture disk therein;

b. an extrusion means installed within said oxidizer storage/extrusion vessel for expelling or extruding a gelled oxidizer from said oxidizer storage/extrusion vessel;

c. a first piping means connected to said outlet port for discharging said oxidizer gel into a combustion chamber, said first piping means extending to and communicating with an oxidizer gel metering valve, throttled by a system controller, said first piping means provided with an oxidizer gel supply/flow pressure gauge with data monitoring means connected to a system controller, said first piping means additionally provided with an oxidizer gel shut-off valve between said oxidizer gel supply/flow pressure gauge and said oxidizer gel metering valve supplying said oxidizer gel to a vortex injector for said combustion chamber, said oxidizer gel shut-off valve operated by a system controller;

d. a second piping means between said outlet port and said oxidizer gel shut-off valve, said second piping means extending to and communicating with said fourth port of said solid fuel-gas generator vessel, said second piping means provided with a reignition shut off valve, operated by a system controller; and, e. a reignition oxidizer gel injector installed in said fourth port of said solid fuel-gas generator vessel, said reignition oxidizer gel injector provided with piping means communicating with said reignition shut-off valve;

C. an engine comprising in combination:
  a. a combustion chamber adapted for containing a hypergolic reaction between fuel-rich combustion effluent and an oxidizer gel;
  b. A combustion effluent vortex injector in communication with said combustion chamber and connected to said fuel-rich combustion effluent metering valve and said piping means for discharging said fuel-rich combustion effluent into said combustion chamber;
  c. an oxidizer gel vortex injector in communication with said combustion chamber and connected to said oxidizer gel metering valve first and said piping means for discharging said oxidizer gel into said combustion chamber; and,
  d. an exhaust nozzle connected to said combustion chamber for exhausting exhaust products produced in said combustion chamber from hypergolic reaction between said fuel-rich combustion effluent and said oxidizer gel; and, D. a system controller for controlling said gel/solid bipropellant propulsion system comprising:
  a. an igniter including means operated by said system controller for activating said igniter for initially igniting said solid fuel-gas generator;
  b. means operated by said system controller for monitoring said oxidizer gel supply/flow pressure gauge;
  c. means connected to said system controller for monitoring said fuel-rich combustion effluent supply/flow line pressure gauge;
  d. control means connected to said system controller for opening and closing said reignition shut-off valve;
  f. control means connected to said system controller for opening and closing said shut-off valve in said piping means connecting said solid fuel-gas generator containment vessel and said oxidizer storage/extrusion vessel;
  g. control means connected to said system controller for opening and closing said oxidizer gel shut-off valve in said first piping means connecting said outlet port and said oxidizer gel metering valve;
  h. throttling means connected to said system controller for controlling the discharging of said oxidizer gel through said oxidizer gel metering valve into said combustion chamber;
  i. control means connected to said system controller for opening and closing said fuel-rich combustion effluent shut-off valve in said piping means connecting said first discharge port and said fuel-rich combustion effluent metering valve;
  j. throttling means connected to said system controller for controlling the discharging of said fuel-rich combustion effluent through said fuel rich combustion effluent metering valve into said combustion chamber; and,
  k. monitoring means connected to said system controller for controlling the discharging of said fuel-rich combustion effluent and said oxidizer gel into said combustion chamber.

5. A gel/solid bipropellant propulsion system having energy management capability including start and restart functions as defined in claim 1 wherein said solid fuel gas generator composition comprises a glycidyl azide polymer diol and/or triol polymerized with a di- or tri-functional isocyanate and wherein said gelled oxidizer contained in said oxidizer storage/extrusion vessel is the gelled oxidizer inhibited red fuming nitric acid.

* * * * *

UNITED STATES PATENT AND TRADEMARK OFFICE
CERTIFICATE OF CORRECTION

PATENT NO. : 5,133,183
DATED : July 28, 1992
INVENTOR(S) : Leo K. Asaoka, William M. Chew, and Douglas L. May It is certified that error appears in the above-identified patent and that said Letters Patent is hereby corrected as shown below:

Column 7, line 35, "3" should be --1--.

Column 10, line 41, "1" should be --4--.

Signed and Sealed this

Fourteenth Day of September, 1993

Attest:

BRUCE LEHMAN

Attesting Officer

Commissioner of Patents and Trademarks